United States Patent
Anderson et al.

(10) Patent No.: US 7,028,179 B2
(45) Date of Patent: Apr. 11, 2006

(54) APPARATUS AND METHOD FOR SECURE, AUTOMATED RESPONSE TO DISTRIBUTED DENIAL OF SERVICE ATTACKS

(75) Inventors: Todd A. Anderson, Beaverton, OR (US); David M. Putzolu, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 773 days.

(21) Appl. No.: 09/898,849

(22) Filed: Jul. 3, 2001

(65) Prior Publication Data

US 2003/0014665 A1 Jan. 16, 2003

(51) Int. Cl.
*H04L 9/00* (2006.01)
(52) U.S. Cl. .................. 713/154; 713/153; 726/13; 726/23; 709/224
(58) Field of Classification Search ........ 713/153–154, 713/201; 709/217–219, 223–225, 229
See application file for complete search history.

(56) References Cited

U.S. PATENT DOCUMENTS

| 6,141,778 A | 10/2000 | Kane et al. |
| 6,425,004 B1 * | 7/2002 | Hardjono ............... 709/223 |
| 6,944,673 B1 * | 9/2005 | Malan et al. ........... 709/237 |
| 2002/0101819 A1 * | 8/2002 | Goldstone ............... 370/229 |

FOREIGN PATENT DOCUMENTS

EP  1 024 642 A2  8/2000

OTHER PUBLICATIONS

Smith et al, A Protocol and Simulation for Distributed Communicating Firewalls, Computer Software and Applications Conference, 1999. COMPSAC '99. Proceedings. The Twenty-Third Annual International, Oct. 27-29, 1999, pp.: 74-79.*

Shyne et al, Using Active Networking to Thwart Distributed Denial of Service Attacks, Aerospace Conference, 2001, IEEE Proceedings. , vol.: 3, Mar. 10-17, 2001, pp.: 3/1103-3/1108 vol. 3.*

(Continued)

Primary Examiner—Gilberto Barron
Assistant Examiner—Minh Dinh
(74) Attorney, Agent, or Firm—Blakely, Sokoloff, Taylor & Zafman LLP

(57) ABSTRACT

An apparatus and method for secure, automated response to distributed denial of service (DDoS) attacks are described. The method includes notification of a DDoS attack received by an Internet host. Once received by an Internet host, the Internet host establishes security authentication from an upstream router from which the attack traffic, transmitted by one or more host computers, is received. The Internet host then transmits filter(s) to the upstream router generated based upon characteristics of the attack traffic. Once installed by the upstream router, the attack traffic is dropped to terminate a DDoS attack. In addition, the router may determine upstream router(s) coupled to ports from which attack traffic is received, and securely forward the filter(s) to the upstream routers as a routing protocol updated in order to drop the attack traffic at a point closer to a source of the DDoS attack.

35 Claims, 12 Drawing Sheets

OTHER PUBLICATIONS

Geng et al, Defeaeting Distributed Denial of Service Attacks, IT Professional, vol.: 2, Issue:4, Jul.-Aug. 2000, pp.: 36-42.*

Mahajan et al, Controlling High Bandwidth Aggregates in the Network, Feb. 2001, Retrieved from the Internet on Oct. 10, 2005, <URL: http://citeseer.ist.psu.edu/cache/papers/cs/23886/http:zSzzSzwww.aciri.orgzSzpushbackzSzpushback-toCCR.pdf/mahajan01controlling.pdf>.*

Copy of Notification of Trans. of IPER mailed Aug. 12, 2004 in co-pending PCT Appl. No. PCT./US02/20759.

Smith, Robert N. and Bhattacharya, Soursav, "Operating Firewalls Outside the LAN Perimeter", IEEE, 1999 pp. 493-498.

Ziegler, Thomas et al., "A Distributed Mechanism for Identification and Discrimination of non TCP-friendly Flows in the Internet", NETWORKING 2000, LNCS 1815, pp. 763-775, 2000.

Copy of International Search Report mailed Apr. 9, 2003 for co-pending PCT Appl. No. PCT/US 02/20759 filed Jun. 27, 2002.

* cited by examiner

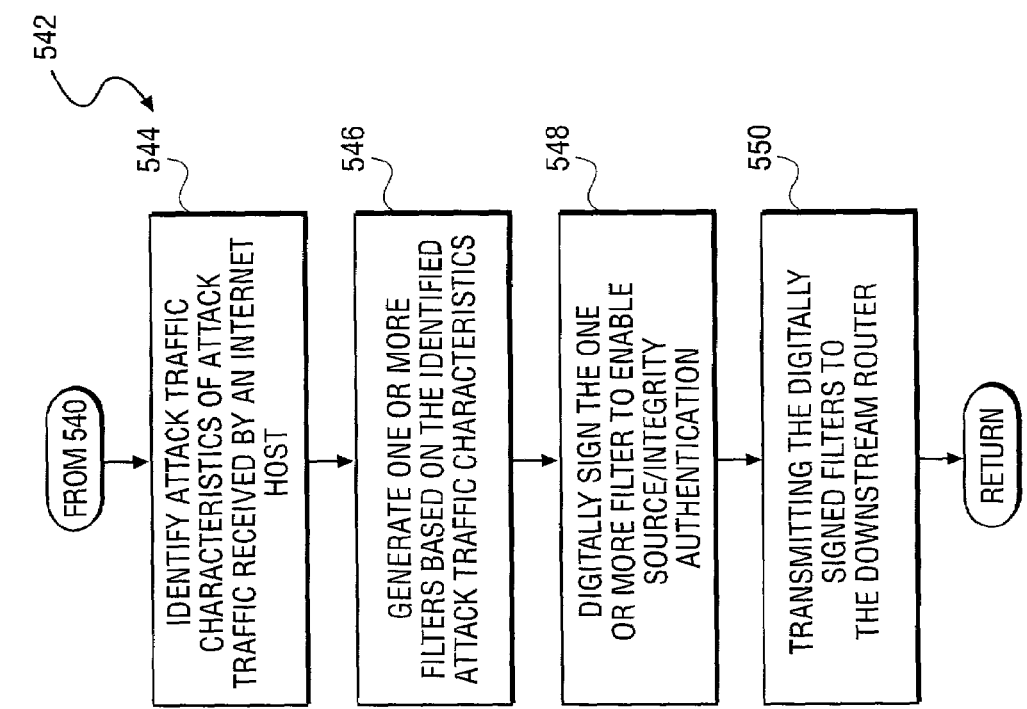
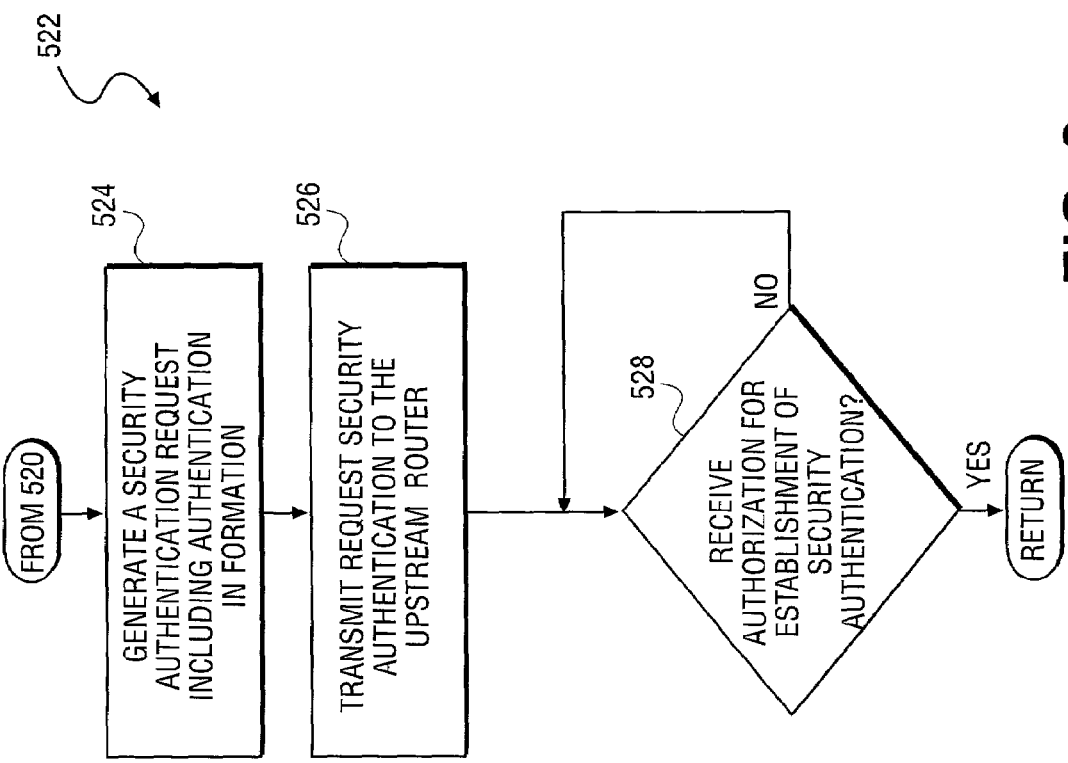

APPARATUS AND METHOD FOR SECURE, AUTOMATED RESPONSE TO DISTRIBUTED DENIAL OF SERVICE ATTACKS

FIELD OF THE INVENTION

The invention relates generally to the field of denial of service attacks. More particularly, the invention relates to a method and apparatus for secure, automated response to distributed denial of service attacks.

BACKGROUND OF THE INVENTION

The advent of the Internet provides Internet users with a worldwide web of information at the click of a button. Accordingly, various businesses have responded to the incredible reach provided by the Internet to enable commerce via channels provided by the Internet. As such, the Internet has become a key mechanism for business to consumer (B2C) and business to business (B2B) commerce. Moreover, many entertainment providers have been quick to utilize the Internet as an additional venue for presenting their entertainment content to users.

Unfortunately, many users of the Internet have experienced substantial delays when engaging in Internet commerce (e-commerce) or receiving entertainment content via the Internet. The delays incurred by most users are due to an inability of the Internet to provide sufficient bandwidth to support the growing number of users which join the Internet on a daily basis. However, improvements in technology are greatly expanding the bandwidth provided by the Internet. In addition, traditional means for receiving or connecting to the Internet, such as modems, are being replaced by T-1 carrier digital lines (T1-lines), cable set-top boxes, DSL (digital subscriber line) or the like, which can provide both content and commerce over the Internet without many of the delays incurred via traditional modems.

In other words, as the bandwidth provided by the Internet grows, and the traditional means for connecting to the Internet extends, the Internet potentially presents a medium for providing both commerce, as well as entertainment content to virtually any person around the world with a simple mouse click of their computer. Unfortunately, as our society gradually moves toward an Internet-based society, devices such as web Internet hosts that are accessed via the Internet for B2C and B2B commerce, as well as entertainment content purposes, become mission critical elements of daily business functions.

With the emergence of distributed denial of service (DDoS), it can become apparent that the open, distributed nature of the Internet can be used for malicious purposes. DDoS attacks can easily bring down a Internet host or router, making the mission critical services experience significant outages. As known to those skilled in the art, DDoS attacks typically consist of a number of hosts sending some sort of attack traffic to a single target Internet host. DDoS attacks typically are no different in content from regular denial of service (DoS) attacks, other than the fact that they are scaled to a much larger degree.

Defense against DoS attacks typically consist of temporary installation of one or more filters to drop traffic from as many attackers as possible. Current mechanisms for such installation require the installation of filters which typically involve human contact between the owner of the attacked Internet host and the administrator(s) of the network delivering the traffic to the Internet host. This communication consists of specifying the information about the traffic, followed by a manual installation of filters in the network to drop such traffic prior to it reaching the Internet host.

Unfortunately, the problem caused by DDoS attacks is exacerbated by the vast scale, which must be responded to, during such an attack. While a manual response may be sufficient, albeit slow for a regular DoS attack originating at a single source, a manual response may fail to prevent a DDoS attack. The failure of a manual response results from the sheer number of attackers in a DDoS attack, which will overwhelm the response capabilities of a system that includes a human element in the action-response loop. Therefore, there remains a need to overcome one or more of the limitations in the above-described, existing art.

BRIEF DESCRIPTION OF THE DRAWINGS

The present invention is illustrated by way of example, and not by way of limitation, in the figures of the accompanying drawings and in which:

FIG. 8 depicts a block diagram illustrating an additional method for establishing security authentication from an upstream router in accordance with a further embodiment of the present invention.

FIG. 9 depicts a block diagram illustrating an additional method for transmitting one or more DDoS squelch filters to the upstream router in accordance with a further embodiment of the present invention.

DETAILED DESCRIPTION

Figure 1:
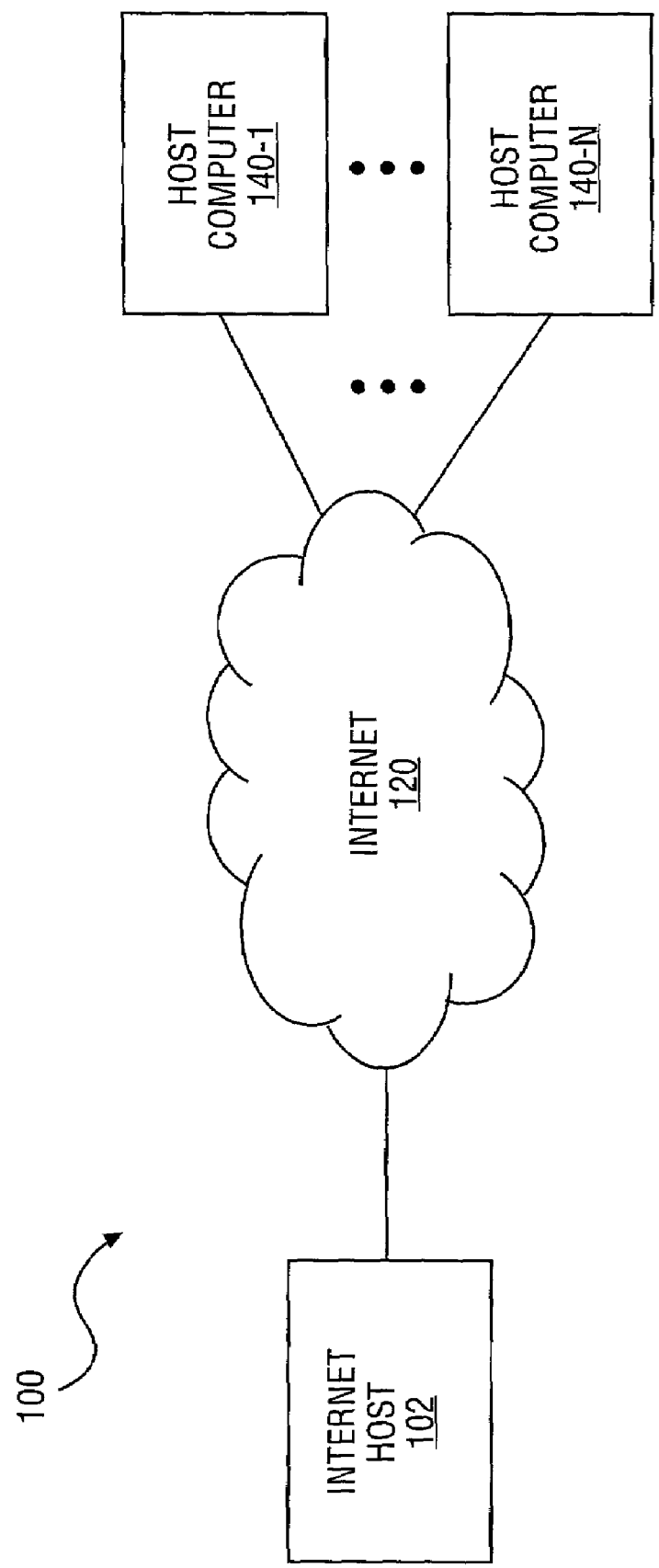
FIG. 1 depicts a block diagram illustrating a conventional computer network as known in the art.

The present invention describes an apparatus and method for secure, automated response to distributed denial of service attacks. The method described includes the receipt of notification of a distributed denial of service (DDoS) attack which is received from one or more attack host computers. Once notification is received, an internet host establishes security authentication with an upstream router from which attack traffic is received. Once security authentication is established, the Internet host transmits one or more squelch filters to the upstream router. The squelch filters are generated by the Internet host based on characteristics of the attack traffic. As a result, once installed by the upstream router, the attack traffic is dropped, thereby terminating the distributed denial of service attack.

The method further includes receiving of the one or more squelch filters by the upstream router. Accordingly, once security authentication is established with a downstream device, which may be either a router or an Internet host, the upstream router will receive the one or more squelch filters and verify that the one or more filters select only network traffic directed to the downstream device. Once verified, the one or more filters are installed. As such, network traffic matching the one or more filters is prevented from reaching the downstream device. In addition, the router may determine one or more upstream routers coupled to a port from which attack traffic is received based on a routing table. Accordingly, the router will securely forward the one or more filters to the upstream routers as a routing protocol update in order to drop the attack traffic at a point closer to a source of the attack.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form to avoid obscuring the details of the present invention.

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (compact discs, read-only-memory) and magneto-optical disks, ROMs (read-only-memory), RAMs (random access memory), EPROMs, (erasable programmable read-only memory), EEPROMs (electrically erasable programmable read-only memory), magnet or optical cards, flash memory, or other types of media/machine-readable medium suitable for storing electronic instructions. Moreover, the present invention may also be downloaded as a computer program product. As such, the program may be transferred from a remote computer (e.g., a Internet host) to a requesting computer (e.g., a client) by way of data signals embodied in a carrier wave or other propagation medium via a communication link (e.g., a modem or network connection).

System Architecture

As described above, distributed denial of service attacks (DDoS) typically consists of a number of attack host computers sending some sort of attack traffic to a single target Internet host. For example, referring to the network 100 as depicted in FIG. 1, the attack host computers 140 (140-1, . . . , 104-N) collectively are directed by some malicious agent to transmit attack traffic to an Internet host 102. As indicated above, the attack traffic is routed through a network, for example, the Internet 120 via one or more routers until received by the Internet host 102.

As described above, defenses DDoS attacks typically consist of temporary installation of one or more filters to drop traffic from as many of the attackers as possible. Current mechanisms for installation of such filters typically involve human contact between the owner of the attacked Internet host and the administrator of the network delivering traffic to the Internet host. Unfortunately, what makes DDoS attacks difficult to respond to is their scale. As depicted in FIG. 1, a plurality of attack host computers 140 collectively transmit attack traffic to the Internet host 102, which will eventually overwhelm the Internet host 102 and require shutdown of the Internet host 102. In fact, the sheer number of attackers in a DDoS attack will overwhelm the response capabilities of any system that includes a human element in the action response loop.

Figure 2:
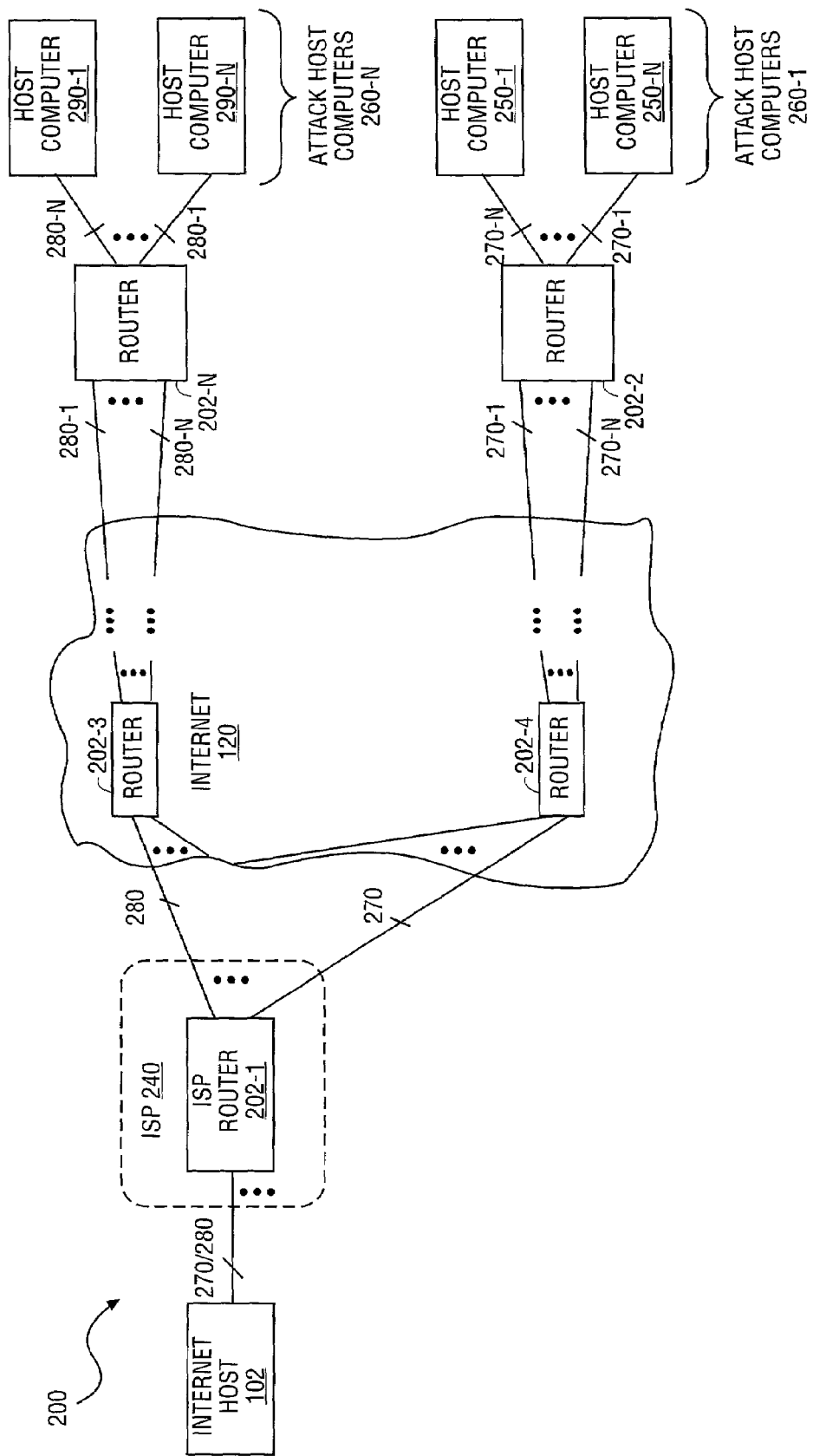
FIG. 2 depicts a block diagram illustrating the conventional computer network as depicted in FIG. 1. when subjected to a distributed denial of service attack.

Referring now to FIG. 2, FIG. 2 depicts the network 100 as illustrated in FIG. 1, further depicting one or more routers 202 (202-1, 202-2, . . . , 202-N), which are responsible for transmitting network traffic and 280 (280-1, . . . , 280-N), which may include attack traffic, to the Internet host 102 via the various attack host computers 250 (250-1, . . . , 250-N) and 290 (290-1, . . . , 290-N). Accordingly, as described above, an Internet host 102 receiving attack traffic 270/280 will generally respond to the DDoS attack by contacting an administrator of the network delivering the traffic to the Internet host.

For example, the Internet host 102 may receive Internet access via, for example, a transmission carrier line (T-1 line) which is leased from an Internet service provider (ISP) 240.

However, those skilled in the art will realize that the Internet host 102 or web Internet host may be hosted by the Internet service provider. In either case, whether hosted or connected via the Internet by a T-1 line, response to a DDoS attack requires installation of one or more filters within a router 202 which is transmitting the filters to the attacked Internet host 102.

Referring again to FIG. 2, the embodiment described illustrates the Internet host 102 which receives Internet access via an ISP 240, such that network traffic is received via ISP router 202-1. Accordingly, response to the DDoS attack would require contacting the administrator of the ISP 240, and an installation, by the administrator, of one or more filters matching characteristics of the attack traffic within the ISP router 202-1. Unfortunately, the manual approach described is cumbersome, often resulting in significant periods of downtime of the Internet host 102 prior to appropriate filters being applied. This is due to the fact that the device being requested to perform the filtering (the upstream router) 202-1 is often in a different administrative domain then that of the attacked Internet host 102.

As such, attack host computers 260 (260-1, . . . , 260-N) may include host computers 250, as well as host computers 290, which collectively generate attack traffic 270/280 (270-1, . . . , 270-N)/(280-1, . . . 280-N). The attack traffic 270/280 is routed via various routers 202, which are received via the Internet 120. The attack traffic 270/280 is eventually routed through to the ISP router 202-1 in order to reach a final destination Internet protocol (IP) address matching the IP address of the Internet host 102. Accordingly, without an automated means for responding to detection of a DDoS attack, Internet hosts, web Internet hosts, or the like throughout the Internet will suffer significant downtime which presents a significant threat to current society which is moving toward an Internet-based society which utilizes the Internet for essential services, as well as entertainment and business needs.

Figure 3:
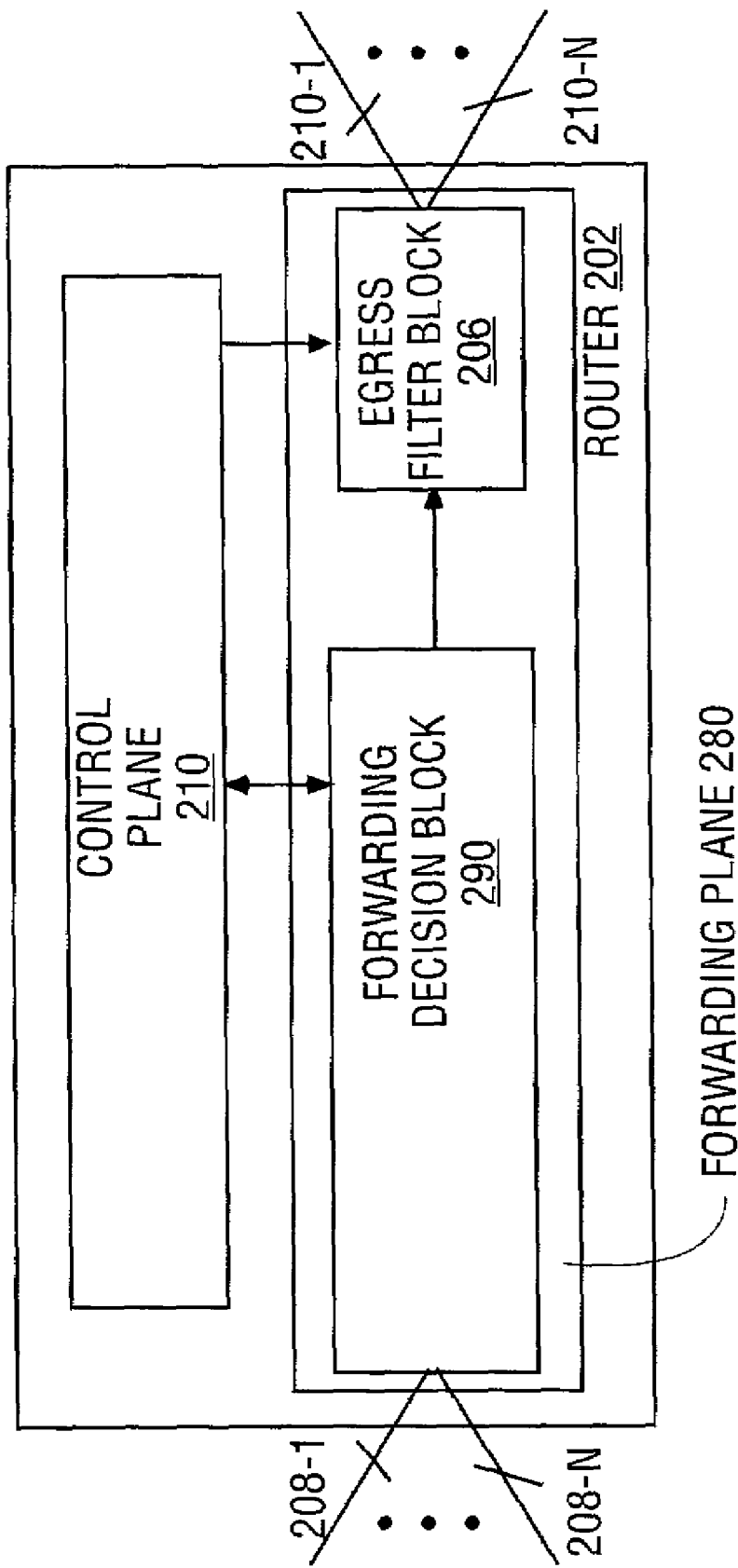
FIG. 3 depicts a block diagram illustrating a conventional router as known in the art.

Referring now to FIG. 3, FIG. 3 depicts a block diagram illustrating a subset of the components of a conventional router 202. The router 202 includes a forwarding plane 280 containing an egress filter 206 and a forwarding decision block 290. The egress filter 206 drops traffic matching certain specifications as provided by the control plane 210. The forwarding decision block 290 decides how to forward the traffic. Accordingly, when a piece of network traffic (packet) is locally addressed, the forwarding decision block 280 forwards the packet to the control plane 210 where it is processed.

Otherwise, the forwarding decision block 280 determines (for example, using a look-up table) an egress port (or output port) and a next hop router through which to route the packet and then passes the packet to the egress filter 206. Once determined, the forwarding plane sends the packet to one or more output/egress ports 210 (210 -1, . . . , 210-N). Unfortunately, conventional routers require manual intervention to instruct the control plane to install a filter into egress filter 206. For example, installation of filters into egress filter 200 is generally via the input of filters by an administrator at an administrator workstation.

Figure 4:
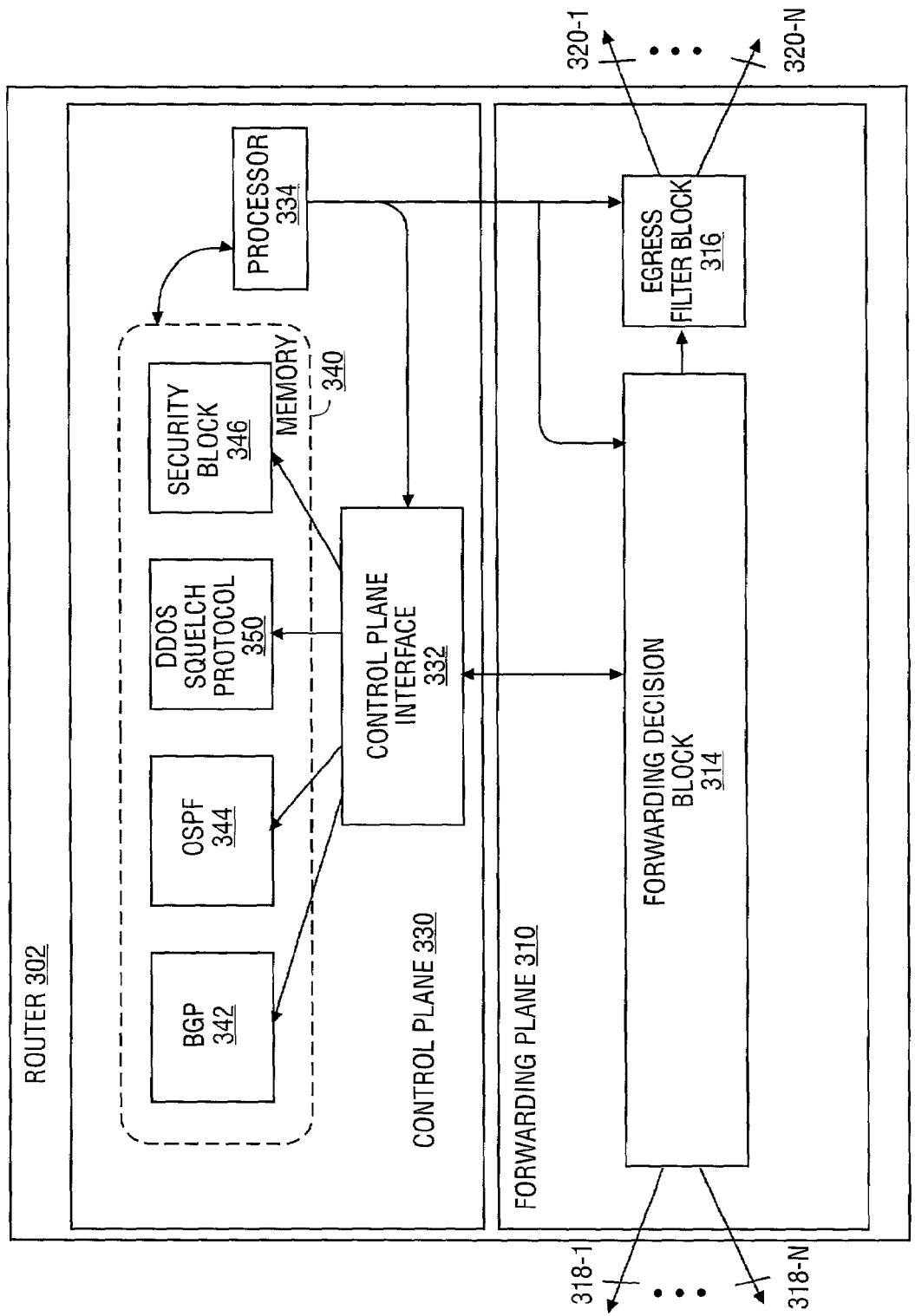
FIG. 4 depicts a block diagram illustrating a router utilizing a distributed denial of service squelch protocol in accordance with an embodiment of the present invention.

Referring now to FIG. 4, FIG. 4 depicts a block diagram illustrating the router 202, as depicted in FIG. 3, modified in accordance with the teachings of the present invention to enable automated and secure response to a distributed denial of service attack. As will be described in further detail below, a DDoS Squelch Protocol 350 component of the router 302 enables receipt and installation of DDoS squelch filters from Internet hosts 102 generated in response to a DDoS attack. In one embodiment, downstream router-to-upstream router filter propagation is accomplished with versions of border gateway protocol (BGP) or open shortest path first (OSPF) protocol that provide the ability to associate filters with particular routes. Accordingly, the described router 302 enables an automated system for responding to DDoS attacks. In one embodiment, the router 302 is accomplished by leveraging existing authentication and message integrity mechanisms defined on a router-to-router basis and on a host-to-router basis to establish authenticated communication.

Referring again to FIG. 4, the router 302 includes a control plane 330 as well as the forwarding plane 310, as illustrated by the router depicted in FIG. 3. As known to those skilled in the art, control plane processing tasks include such tasks as routing protocols and admission controls. Forwarding plane processing includes data-path packet processing, such as layer 2 and layer 3 switching, packet redirection, packet filtering and packet manipulation. However, the control plane 330 is modified in order to implement a DDoS squelch protocol 350 which may utilize a public key infrastructure (PKI), as well as Internet protocol security (IPSec) in order to establish security authentication between upstream, as well as downstream, devices requesting entry of one or more filters which match attack traffic characteristics in order to terminate a DDoS attack.

In the embodiment depicted in FIG. 4, the control plane 330 includes a processor 334 which directs a control plane interface 332. The control plane interface 332 handles the various protocols implemented on the router 302. In one embodiment, the router 302 may utilize a border gateway protocol (BGP) block 342, as well as an open shortest path first (OSPF) protocol block 344. As known to those skilled in the art, the BGP protocol is a protocol for exchanging routing information between gateway hosts in a network of autonomous systems. BGP utilizes a routing table containing a list of known routers, the addresses they can reach and a cost metric associated with the path to each router so that the best available route is chosen.

In contrast, the OSPF protocol is a router protocol used within larger, autonomous system networks. Using OSPF, a host or a Internet host that obtains a change to a routing table or detects a change in the network, immediately multi-casts the information to all other hosts in the network so that all will have the same routing table information. Generally, only the portion of the routing table that is changed is transmitted using OSPF. However, in contrast, to conventional routers, which are generally limited to the BGP and OSPF protocols, router 302 implements a DDoS squelch protocol. As depicted in FIG. 4, the control plane 330 includes the DDoS squelch protocol block 350, which utilizes the security block 346 in order to authenticate a source of filters as well as to establish security authentication with downstream routers when forwarding of received filters.

Figure 5A:
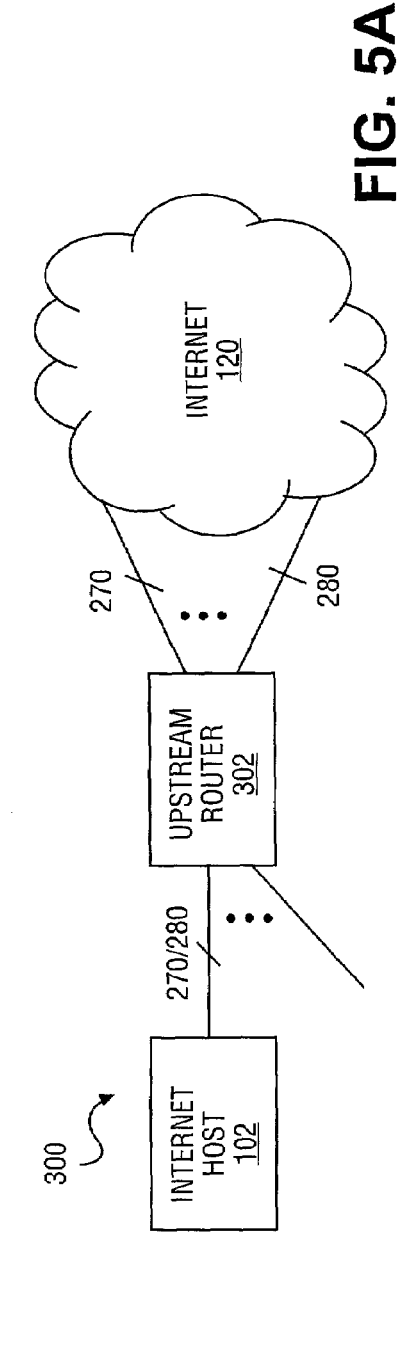
FIGS. 5A and 5B depict the network as depicted in FIG. 3, utilizing an upstream router modified in accordance with the teachings of the present invention to illustrate a further embodiment of the present invention.
Figure 5B:
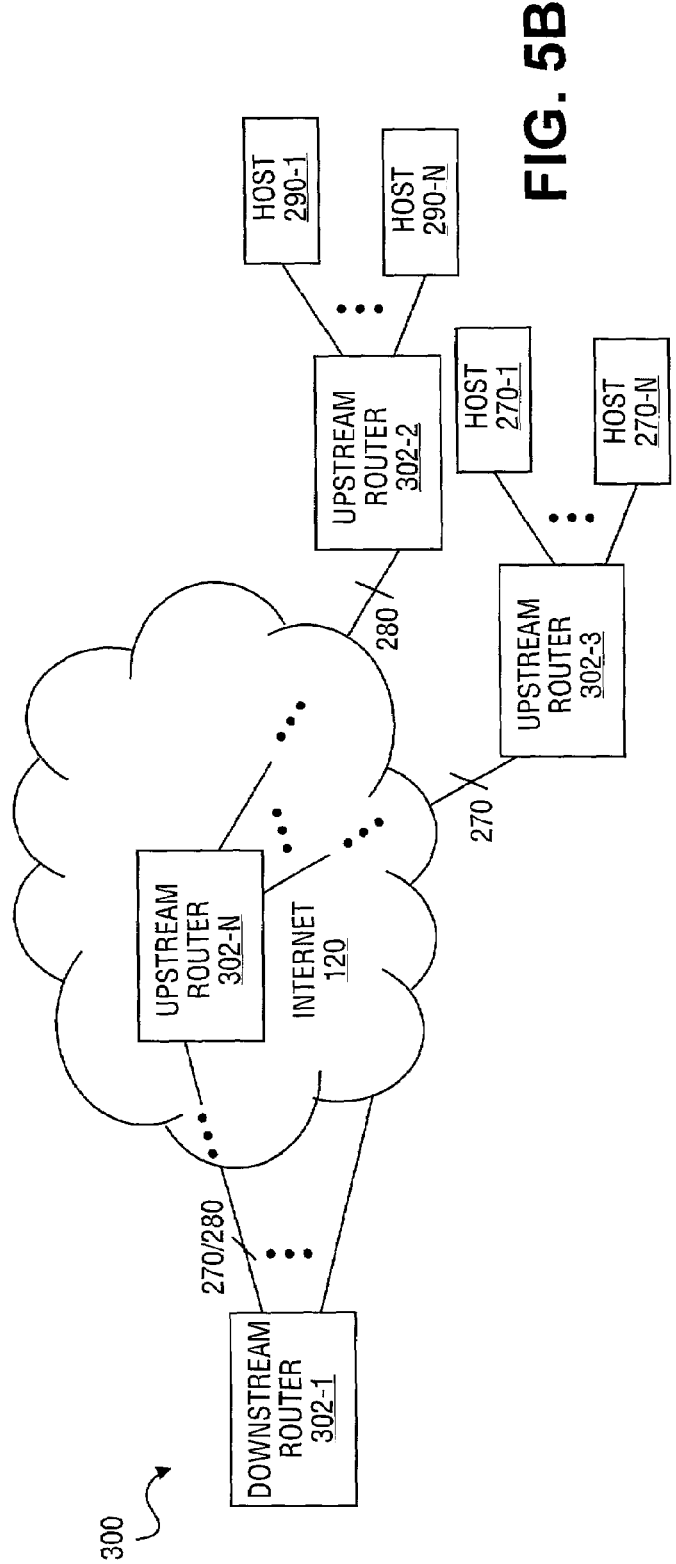

Accordingly, FIGS. 5A and 5B illustrate a router 302, as depicted in FIG. 4, utilized within the network 200 depicted in FIG. 2. As a result, a Internet host 102 that desires to respond to a DDoS attack establishes security authentication with an upstream router 302 configured as depicted in FIG. 4. Accordingly, the router 302 would receive the one or more filters via an input port 318 (318-1, . . . , 318-N). As such, a forwarding decision block 312 will determine whether a received network packet is locally addressed to the router 302. When such is detected, the network packet is transferred to the control plane interface 332.

Accordingly, the control plane interface 332, as directed by the processor 344, would invoke the DDoS squelch protocol block 350 in order to establish security authentication of the Internet host 102. In one embodiment, the upstream router 302 uses an identity system, such as the public key infrastructure in responding to security authentication requests from the Internet host. As known to those skilled in the art, the public key infrastructure (PKI) enables users of an insecure public network, such as the Internet, to securely and privately exchange data and money through the use of a public and private cryptographic key pair that is obtained and shared through a trusted authority.

Utilizing a digital certificate, PKI allows identification of an individual or an organization based on a received, encrypted digital certificate. Accordingly, authentication of a source occurs by receiving and decrypting a digital certificate using a public key of the source. Consequently, once decrypted, the digital certificate can be reviewed in order to authenticate that the principal requesting entry of one or more DDoS squelch within a router is, indeed, the Internet host in question. As described herein, the term "security authentication" refers to authentication that the principal requesting entry of one or more DDoS squelch filters within a router is, indeed, an Internet host in question or a downstream router.

In one embodiment, the router 302 performs security authentication using PKI and in addition to the digital certificate, receives a specific IP address on which attack traffic is being received. Accordingly, once security authentication is established, the Internet host 102 sends one or more DDoS filter entries to the upstream router 302. Once received, the upstream router utilizes the DDoS squelch protocol block 350 to verify that each filter that has been received from the Internet host 102 will affect no other downstream hosts. This verification is accomplished by ensuring that the requested filter contains a destination IP component that matches the authenticated address of the Internet host 102. In one embodiment, the Internet host digitally signs the one or more filters in order to enable both source as well as integrity authentication.

Furthermore, layer-2 to filtering is of no use in preventing a DDoS attack. Accordingly, the upstream router forbids filtering on any layer-2 protocol field. As such, the upstream router 302 allows all remaining layer 3+ fields of the filter (e.g., SIP, DPORT) to be set to whichever values the Internet host 102 has specified to describe one or more of the attacking flows. In addition, the received filters require some mechanism for deactivation as well, preferably, a specific lifetime associated with each filter. In one embodiment, this is referred to as the DDoS squelch time to live (TTL) value, which is different than the TTL value of conventional packets. As such, when the lifetime has expired, the upstream router 302 removes the filter. In addition to the above constraints, the action performed on all packets that match the given constraint is always drop.

In one embodiment, the integrity and authenticity of router to router and Internet host to router messages is protected using Internet protocol security (IPsec). IPsec is a developing standard for security at the network or packet processing layer of network communication. As known to those skilled in the art, IPSEC provides two choices of security service—authentication header (AH), which essentially allows authentication of the sender data, and encapsulating security payload (ESP), which supports both authentication of the sender and encryption of data, as well. The specific information associated with each of these services is inserted into the packet in a header that follows the IP packet header. Separate key protocols can be selected, such as ISAKMP/Oakley protocol. As described herein, digital certificates authentication headers, digital signatures, ESP or the like are collectively referred to here in "authentication information."

As such, utilizing the various secure connection requirements, as well as the various verifications that are performed on the filters, the action on the router's part is safe, both from the point of view of traffic that the router wishes to drop and traffic that the router wishes to pass. Namely, filters designed in accordance with the teachings of the present invention, once installed, are safe in terms of traffic that the router would normally drop and that the action of the filter must also be drop. Thus, no new traffic would be allowed through such a filter.

In addition, the constraints associated with delivery of the filter as well as the characteristics of the filter itself ensure that the filter will drop traffic to the particular Internet host 102 requesting the filter. Thus, the filter will not affect any other recipients of traffic passing through the router. Moreover, message integrity mechanisms used to transmit the filter (which are also collectively referred to herein as "security authentication") ensure that other hosts cannot tamper with such a filter. Accordingly, protection is provided against the possibility of a third party using a man in the middle attack to modify any such filters.

Referring again to FIGS. 5A and 5B, FIGS. 5A and 5B depict the network 200 as depicted in FIG. 3, utilizing an upstream router 302 modified in accordance with the teachings of the present invention. Referring to FIG. 5A, the Internet host 102 receives notification of a DDoS attack based on attack traffic 270/280. Accordingly, once notified, the Internet host 102 establishes security authentication with the router 302 and transmits one or more filters matching the attack traffic 270/280. Accordingly, once installed, attack traffic will no longer be received by the Internet host 102, resulting in termination of the DDoS attack.

Referring now to FIG. 5B, FIG. 5B depicts an embodiment which occurs once the upstream router 302 has installed the one or more received filters. Accordingly, once the upstream router 302-1 has received and authenticated such filters, the router 302 becomes a downstream router and may securely forward the filters to other routers further upstream as a routing protocol update. Such action may be required if the scale of the attack is such that dropping the attack traffic closer to a source of the DDoS attack is necessary. As with the host-to-router scenario, the restricted nature of the filter allows it to be safely installed using security authentication which collectively includes the following.

Accordingly, the router-to-router communication of the filter can be authenticated using the BGP and OSPF security mechanisms. In addition, the various received packets are, in certain embodiments, authenticated using AH or ESP provided by IPsec. Alternatively, the filters may be digitally signed to enable source or integrity authentication, each of which are collectively referred to as "security authentication." Furthermore, a router receiving a routing protocol update containing one or more DDoS squelch filters can compare a destination IP address of the attack traffic against its routing table to verify that the destination IP address matches the address from which the routing protocol update was received.

In other words, the upstream router, for example 302-N, will only install filters that drop attack traffic from a router that would actually receive the traffic in question. Accordingly, implementation of the various routers may be achieved using such protocols as the common open policy service protocol (COPS). COPS is a proposed standard protocol for exchanging network policy information between a policy decision point (PDP) in a network and a policy enforcement point (PEPS). Alternatively, such filters can be generated using simple network management protocol (SNMP). SNMP is the protocol governing network management and the monitoring of network devices and their functions.

As described below, the following includes one possible policy information base (PIB) syntax utilizing COPS in order to implement the DDoS squelch protocol as described by the present invention.

```
ClientSquelchTable OBJECT-TYPE
        SYNTAX      SEQUENCE OF SquelchEntry
        POLICY-ACCESS install
        STATUS      current
        DESCRIPTION
"An ISP client installs this information on the PEP and describes which packets to
squelch. The PEP must verify that the destination IP address contained in this filter
matches the authenticated address of the source installing this squelch entry."
        ::={ filteringPibClass 6 }
squelchEntry OBJECT-TYPE
        SYNTAX      SquelchEntry
        STATUS      current
        DESCRIPTION
        "A single squelch request."
        ::={ ClientSquelchTable 1 }
SquelchEntry ::=SEQUENCE {
        /* No explicit "action" field is needed since it must be drop */
        nextHopRouter   InetAddress,/* the IP address of the next hop router for which
to drop traffic matching the remaining filter specification */
        srcIpAddress           InetAddress,/* source address of the attacking traffic */
        srcIpAddress_set       Truth Value,/* does this filter use the previous field? */
        srcIpMask              InetAddress,/* source network mask of said traffic */
        srcIpMask_set          Truth Value,/* does this filter use the previous field? */
        destIpAddress          InetAddress,/* destination address of the attacking
traffic */
        destIpAddress_set      Truth Value,/* does this filter use the previous field? */
        destIpMask             InetAddress,/* destination network mask of said traffic
*/
        destIpMask_set         Truth Value,/* does this filter use the previous field? */
        srcPort                Integer,/* transport protocol source port */
        srcPort_set            Truth Value,/* does this filter use the previous field? */
        destPort               Integer,/* transport protocol destination port */
        destPort_set           Truth Value,/* does this filter use the previous field? */
        protocol               Integer,/* protocol of the attacking traffic */
        protocol_set           Truth Value /* does this filter use the previous field? */
}
nextHopRouter OBJECT-TYPE
        SYNTAX          InetAddress,
        POLICY-ACCESS   INSTALL
        STATUS          current
        DESCRIPTION "The next hop router ad dress to which the attacking traffic is
being forwarded. This address must match the authenticated address of the router that
requested this squelch entry."
        ::={ SquelchEntry 1 }
srcIpAddress OBJECT-TYPE
        SYNTAX          InetAddress,
        POLICY-ACCESS   INSTALL
        STATUS          current
        DESCRIPTION "If srcIpAddress_set is true, this specifies the source IP
address for which to match packets."
        ::={ SquelchEntry 2 }
srcIpAddress_set OBJECT-TYPE
        SYNTAX          Truth Value,
        POLICY-ACCESS   INSTALL
        STATUS          current
        DESCRIPTION "If true, this field specifies that srcIpAddress is part of the
requested filter."
        ::={ SquelchEntry 3 }
srcIpMask OBJECT-TYPE
        SYNTAX          InetAddress,
        POLICY-ACCESS   INSTALL
        STATUS          current
        DESCRIPTION "If srcIpMask_set is true, this specifies the source network
mask used to match packets."
        ::={ SquelchEntry 4 }
```

```
srcIpMask_set OBJECT-TYPE
      SYNTAX            Truth Value,
      POLICY-ACCESS     INSTALL
      STATUS            current
      DESCRIPTION "If true, this field specifies that srcIpMask is part of the
requested filter."
      ::={ SquelchEntry 5 }
destIpAddress OBJECT-TYPE
      SYNTAX            InetAddress,
      POLICY-ACCESS     INSTALL
      STATUS            current
      DESCRIPTION "If destIpAddress_set is true, this field specifies the
destination address for which to match packets."
      ::={ SquelchEntry 6 }
destIpAddress_set OBJECT-TYPE
      SYNTAX            Truth Value,
      POLICY-ACCESS     INSTALL
      STATUS            current
      DESCRIPTION "If true, this field specifies that destIpAddress is part of the
requested filter."
      ::={ SquelchEntry 7 }
destIpMask OBJECT-TYPE
      SYNTAX            InetAddress,
      POLICY-ACCESS     INSTALL
      STATUS            current
      DESCRIPTION "If destIpMask_set is true, this specifies the destination
network mask used to match packets."
      ::={ SquelchEntry 8 }
destIpMask_set OBJECT-TYPE
      SYNTAX            Truth Value,
      POLICY-ACCESS     INSTALL
      STATUS            current
      DESCRIPTION "If true, this field specifies that destIpMask is part of the
requested filter."
      ::={ SquelchEntry 9 }
srcPort OBJECT-TYPE
      SYNTAX            Integer,
      POLICY-ACCESS     INSTALL
      STATUS            current
      DESCRIPTION "If srcPort_set is true, this field specifies which TCP or UDP
source port on which to filter. Protocol must be specified in order to use this field."
      ::={ SquelchEntry 10 1
srcPort_set OBJECT-TYPE
      SYNTAX            Truth Value,
      POLICY-ACCESS     INSTALL
      STATUS            current
      DESCRIPTION "If true, this specifies that the TCP or UDP source port is to
be used to match packets."
      ::={ SquelchEntry 11 }
destPort OBJECT-TYPE
      SYNTAX            Integer,
      POLICY-ACCESS     INSTALL
      STATUS            current
      DESCRIPTION "If destPort_set is true, this field specifies which TCP or UDP
destination port on which to filter. Protocol must be specified in order to use this
field."
      ::={ SquelchEntry 12 }
destPort_set OBJECT-TYPE
      SYNTAX            Truth Value,
      POLICY-ACCESS     INSTALL
      STATUS            current
      DESCRIPTION "If true, this specifies that the TCP or UDP destination port is
to be used to match packets."
      ::={ SquelchEntry 13 }
protocol OBJECT-TYPE
      SYNTAX            Integer,
      POLICY-ACCESS     INSTALL
      STATUS            current
      DESCRIPTION "If protocol_set is true, this field specifies the IP protocol to
be matched against."
      ::={ SquelchEntry 14 }
protocol_set OBJECT-TYPE
      SYNTAX            Truth Value,
      POLICY-ACCESS     INSTALL
      STATUS            current
      DESCRIPTION "If true, this specifies that protocol is to be used to match
packets."
      ::={ SquelchEntry 15 }
```

As such, utilizing the above-described syntax, those skilled in the art may implement a DDoS squelch protocol as taught by the present invention. Procedural methods for implementing the teachings of the present invention are now described.

Operation

Figure 6:
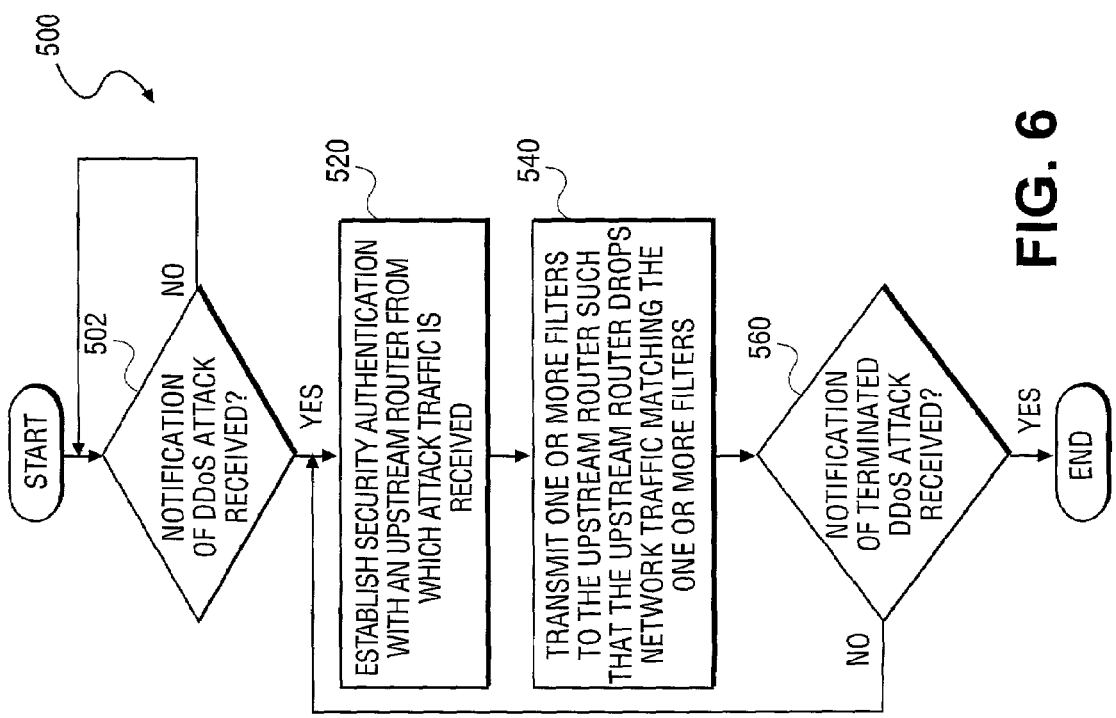
FIG. 6 depicts a block diagram illustrating a method for a secure, automated response to a distributed denial of service attack in accordance with an embodiment of the present invention.

Referring now to FIG. 6, FIG. 6 depicts a block diagram illustrating a method for secure, automated response to a distributed denial of service attack (DDoS), for example, within the network 300 as depicted in FIG. 5A. At process block 502, a Internet host 102 may receive notification of a DDoS attack. When the Internet host 102 receives notification of a DDoS attack, process block 520 is performed. At process block 520, the Internet host 102 establishes security authentication with an upstream router 302 from which attack traffic is received. In the various embodiments, security authentication is established using the public key infrastructure Internet Protocol security, digital signatures, router-to-router security mechanisms or the like.

Next, at process block 540, the Internet host 102 transmits one or more DDoS squelch filters to the upstream router 302. As described above, the one or more DDoS squelch filters direct the upstream routers 302 (302-1, ..., 302-N) to drop network traffic matching the one or more filters once installed in egress filter 316. Accordingly, network traffic matching the one or more filters is referred to herein as "attack traffic". Finally, at process block 560, it is determined whether notification of termination DDoS attack is received in response to installation of the one or more filters by the upstream router 302. As such, process blocks 520–540 are repeated until the DDoS attack is terminated.

Figure 7:
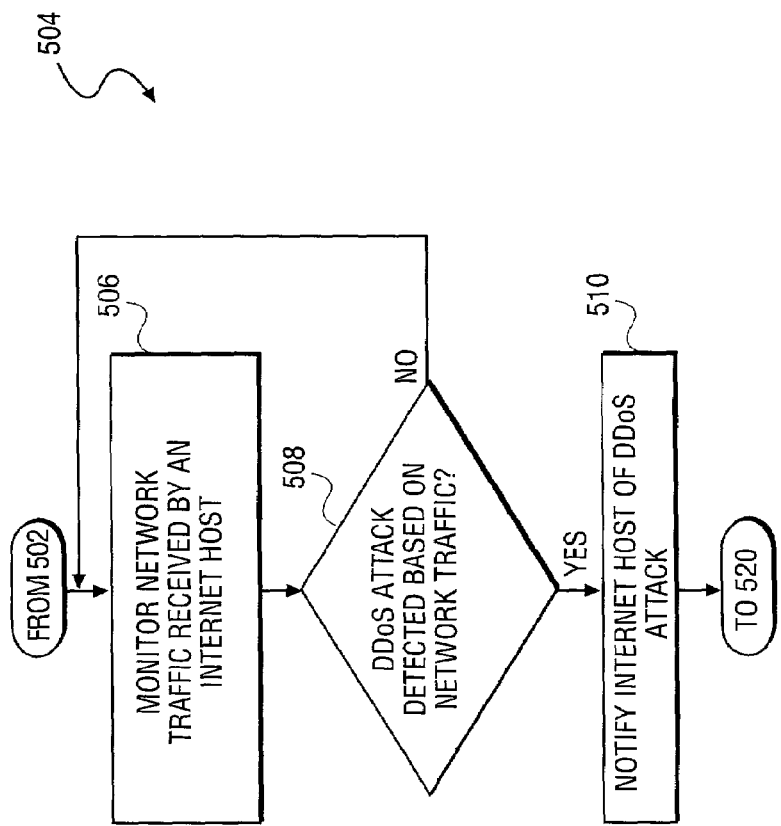
FIG. 7 depicts a block diagram illustrating an additional method for receiving notification of a distributed denial of service attack in accordance with a further embodiment of the present invention.

Referring now to FIG. 7, FIG. 7 depicts an additional method 504 for notification of the detection of a DDoS attack at process block 502, as depicted in FIG. 6. At process block 506, network traffic received by an Internet host 102 is monitored. In one embodiment, monitoring of the network traffic received by the Internet host 102 is performed using pattern recognition, such as fuzzy logic, which can be trained to determine normal traffic levels. Based on the normal average traffic levels, the fuzzy logic can determine when traffic levels go above a pre-determined amount or threshold from the normal level in order to detect a DDoS attack. However, detection of DDoS attack as contemplated by the present invention includes various conventional techniques for detection of DDoS attacks.

As such, it is determined whether a volume of the network traffic exceeds a pre-determined threshold above a normal or average traffic volume. When such is detected, a DDoS attack is detected at process block 508 and process block 510 is performed. In one embodiment, the pre-determined threshold is based on normal, average traffic levels as compared to traffic levels during a detected attack. However, DDoS attack detection is not limited to excessive traffic levels as described. At process block 510, the Internet host is notified of a DDoS attack, including various attack traffic 270/280. Once detected, control flow returns to process block 520 of FIG. 6.

Referring now to FIG. 8, FIG. 8 depicts a block diagram illustrating an additional method for performing the establishment of security authentication with the downstream router of process block 520 as depicted in FIG. 6. At process block 524, the Internet host generates a security authentication request. At process block 526, the Internet host 102 transmits the security authentication request to the upstream router 302 that includes authentication information as well as a destination address of the attack traffic. Finally, at process block 528, it is determined whether the Internet host 102 has received authorization for establishment of security authentication with the downstream router 302. Once received, control flow returns to process block 520, as depicted in FIG. 6.

Referring now to FIG. 9, FIG. 9 depicts an additional method 542 for performing transmission of the one or more DDoS squelch filters of process block 540 as depicted in FIG. 6. At process block 544, the Internet host 102 identifies attack traffic characteristics of the attack traffic received by the Internet host 102. In one embodiment, the attack traffic characteristics include one or more of a destination port of the attack traffic, a source port of the attack traffic, a source IP address of the attack traffic, a destination IP address of the attack traffic, and a time to live component of the attack traffic.

At process block 546, the Internet host 102 generates one or more DDoS squelch filters based on the identified attack traffic characteristics. As described above, an action component of the one or more filters directs dropping of network traffic matching the one or more filters (attack traffic). At process block 548, the Internet host 102 digital signs the one or more filters to enable source and integrity authentication. Finally, at process block 550, the Internet host 102 transmits the one or more filters to the upstream router 302. Once transmitted, control flow returns to process block 540, as depicted in FIG. 6. Accordingly, once the filters are received by the upstream router 302, installation of the filters and dropping of matching network traffic should result in termination of the DDoS attack at the Internet host 102.

Figure 10:
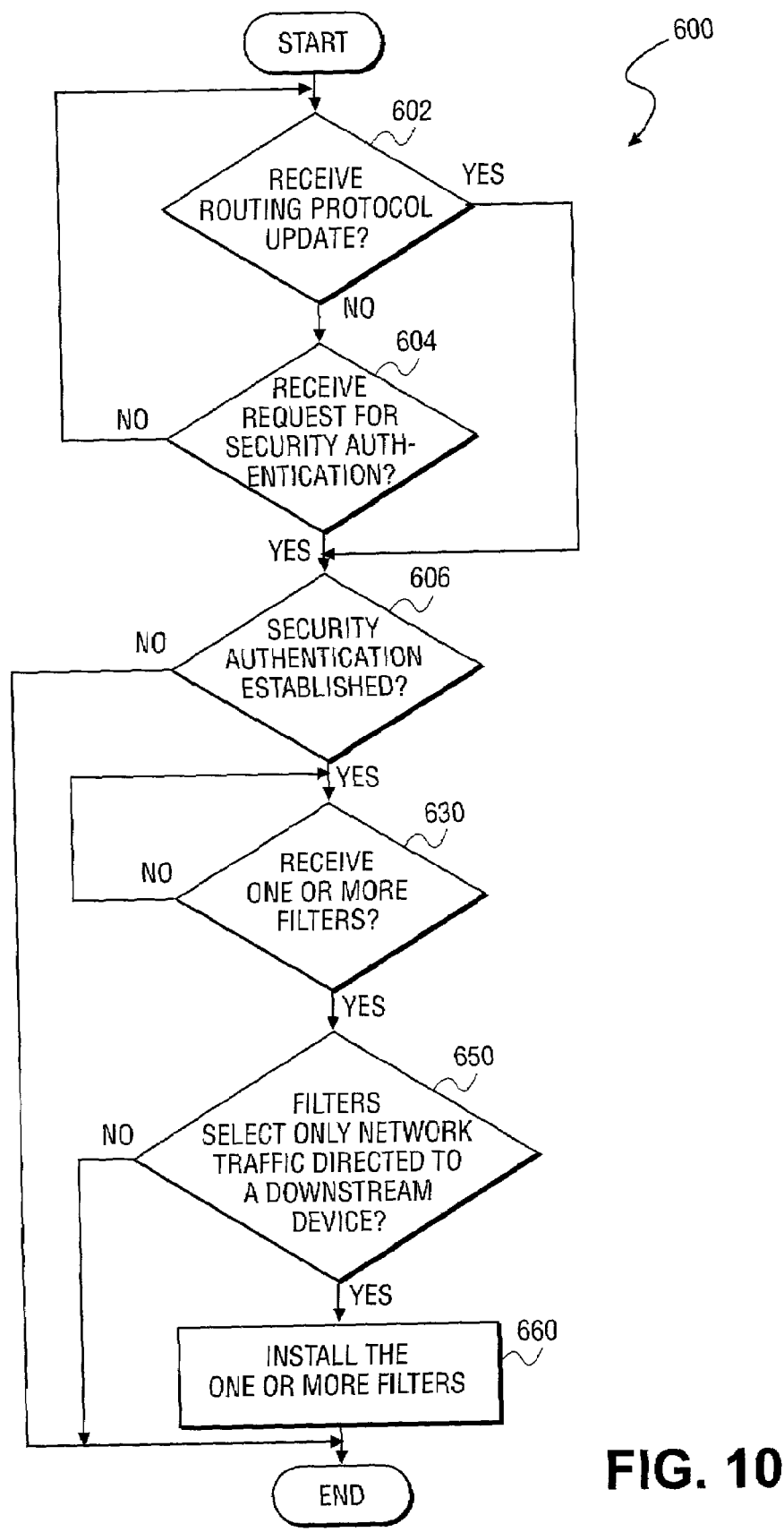
FIG. 10 depicts a block diagram illustrating a method for responding to a distributed denial of service attack in response to one or more received DDoS squelch filters in accordance with a further embodiment of the present invention.

Referring now to FIG. 10, FIG. 10 depicts a method for installation of one or more received filters by an upstream router in order to terminate DDoS attack, for example, within the network 300 as depicted in FIGS. 5A and 5B. At process block 602, an upstream router 302 may receive a routing protocol update. Otherwise, at process block 604, the upstream router 302 may receive a request for security authentication from a downstream device. In one embodiment, the downstream device is the Internet host 102. However, in an alternate embodiment, the downstream device is, for example, a downstream router that has received and installed one or more DDoS squelch filters for squelching a DDoS attack and is now securely forwarding the one or more filters to a router connected to a port from which attack traffic is being received.

Once a request is received, process block 606 is performed. At process block 604, the upstream router establishes security authentication of the downstream device. Once security authentication is established, process block 630 is performed. At process block 630, the upstream router 302 may receive one or more DDoS squelch filters from the downstream device as part of a routing protocol update. Once the one or more filters are received, process block 650 is performed. At process block 650, it is determined whether the filters select only network traffic directed to the downstream device. When such is the case, process block 660 is performed.

At process block 660, the upstream router will install the one or more filters. Accordingly, once installed, the upstream router will drop network traffic matching the characteristics indicated in the one or more filters, thereby dropping attack traffic and terminating the DDoS service attack. Moreover, the various checks of the filters ensure that other devices are not affected by installation of the one or more filters and security authentication of the downstream device prevents malicious use of the DDoS squelch protocol as described herein.

In one embodiment, as depicted in FIG. 4, when a router receives a routing protocol update, the forwarding decision block 314 sends the routing protocol update packet to the control plane interface 332 which forwards it to either the BGP block 342 or the OSPF block 344. Each of these blocks authenticates the source of the protocol update possibly with the help of security block 346 and the PKI infrastructure. Now referring to FIG. 11, when a router receives a routing protocol update 620, the router first authenticates that the validity of the update 622. Then, for each destination network in the routing table, if one or more associated DDoS squelch filter are provided, those filters are put in the egress filter 316 from FIG. 4.

Figure 11:
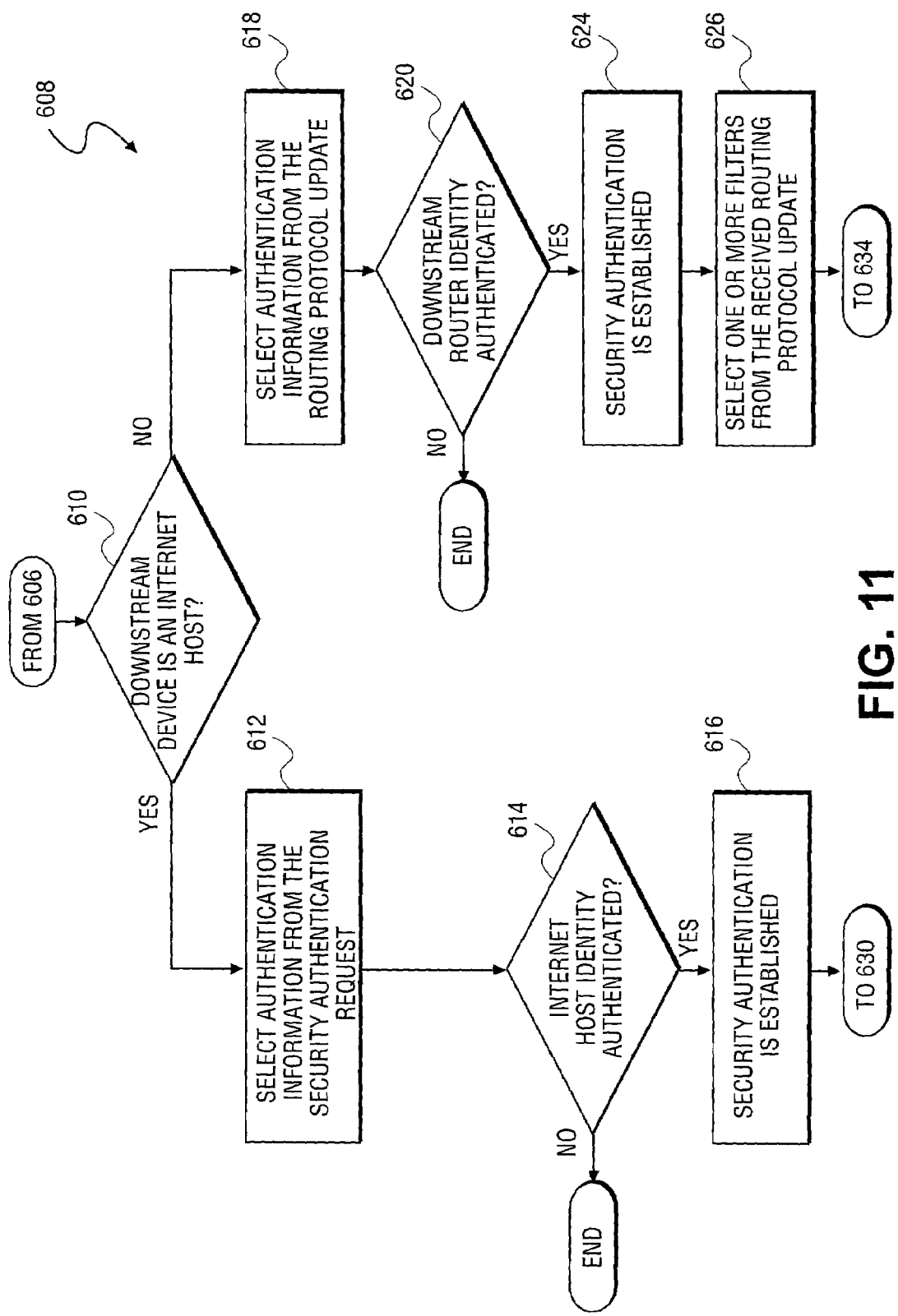
FIG. 11 depicts a block diagram illustrating an additional method for establishing security authentication from with a downstream device in accordance with a further embodiment of the present invention.

Referring now to FIG. 11, FIG. 11 depicts an additional method 608 for establishing security authentication of the downstream device. At process block 610, it is determined whether the downstream device is an Internet host 102. When the downstream device is an Internet host 102, process block 612 is performed. Otherwise, process block 618 is performed. At process block 612, the upstream router selects authorization information from the security authentication request received from an Internet host 102. In one embodiment, the Internet host 102 and router 302 may utilize the public key infrastructure for performing source authentication. As such, the authentication information is a digital certificate which may be encrypted.

Next, the upstream router 302 decrypts any encrypted authentication information. In one embodiment, the public key infrastructure enables the use of a public key to decrypt a digital certificate received as the authorization information. At process block 614, it is determined whether an identity of the Internet host matches the received authentication information. When authentication fails, the process terminates. Otherwise, process block 616 is performed. At process block 616, the upstream router 302 establishes successful security authentication of the Internet host 102. Alternatively, authentication may be provided by digital signed messages received from the downstream device which enables both source and integrity authentication. Once performed, control flow returns to process block 630, as depicted in FIG. 10.

However, when the downstream device is a router, as detected at process block 610, process block 618 is performed. At process block 618, the router selects authentication information (e.g., an authentication header) from the routing protocol update. When encrypted, the authentication information is decrypted. Once selected, process block 622 is performed. At process block 622, it is determined whether the downstream router identity is authenticated based on the authentication information. Alternatively, a digital signature may be used for source authentication. When authorization fails, the process terminates. Otherwise, process block 624 is performed. At process block 626, the router selects the one or more DDoS squelch filters from the routing protocol update.

Figure 12:
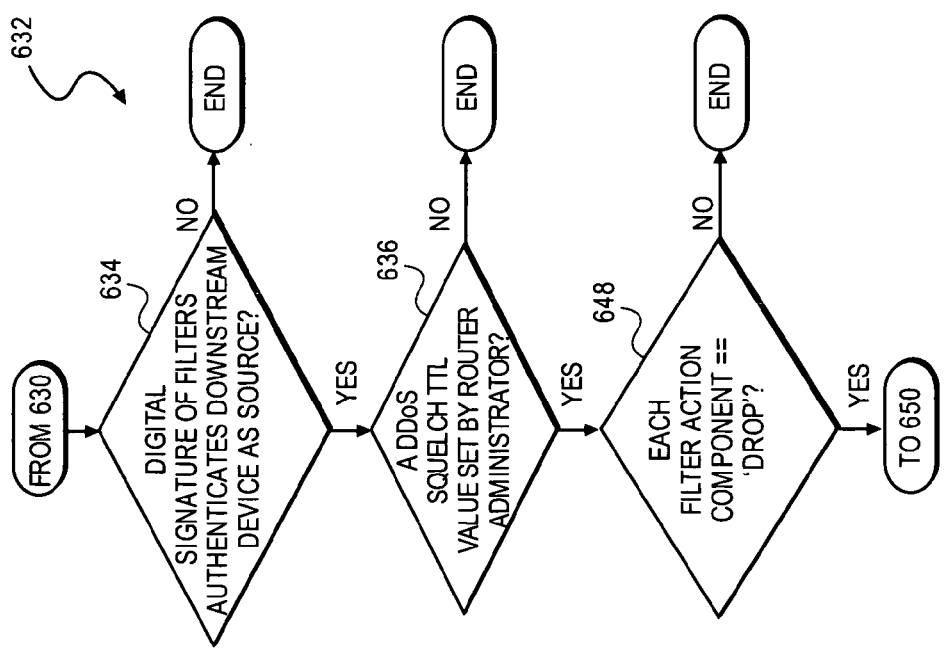
FIG. 12 depicts a block diagram illustrating an additional method for receiving one or more DDoS squelch filters from a downstream device in accordance with a further embodiment of the present invention.

Referring now to FIG. 12, FIG. 12 depicts an additional method 632 for receipt (or selection from a routing protocol update) of the one or more filters of process block 630 as depicted in FIG. 10. At process block 634, the router 302 utilizes a digital signature of the one or more filters to verify a source of the filters as the downstream device. In addition, the digital signature may be used for integrity authentication. Next, at process block 636, it is determined whether an administrator of the router has set a DDoS squelch TTL value for received DDoS squelch filters. This pre-determined TTL value enables the router 302 to generate an expiration time for each filter and remove any installed filters once the generated expiration time has expired. Next, process block 648 is performed. At process block 648, it is verified that an action component of each filter is "drop", otherwise, the one or more received filters are disregarded. However, if each filter contains a DDoS squelch TTL value and an action component of each filter is "drop", control flow returns to process block 650, as depicted in FIG. 10.

Figure 13:
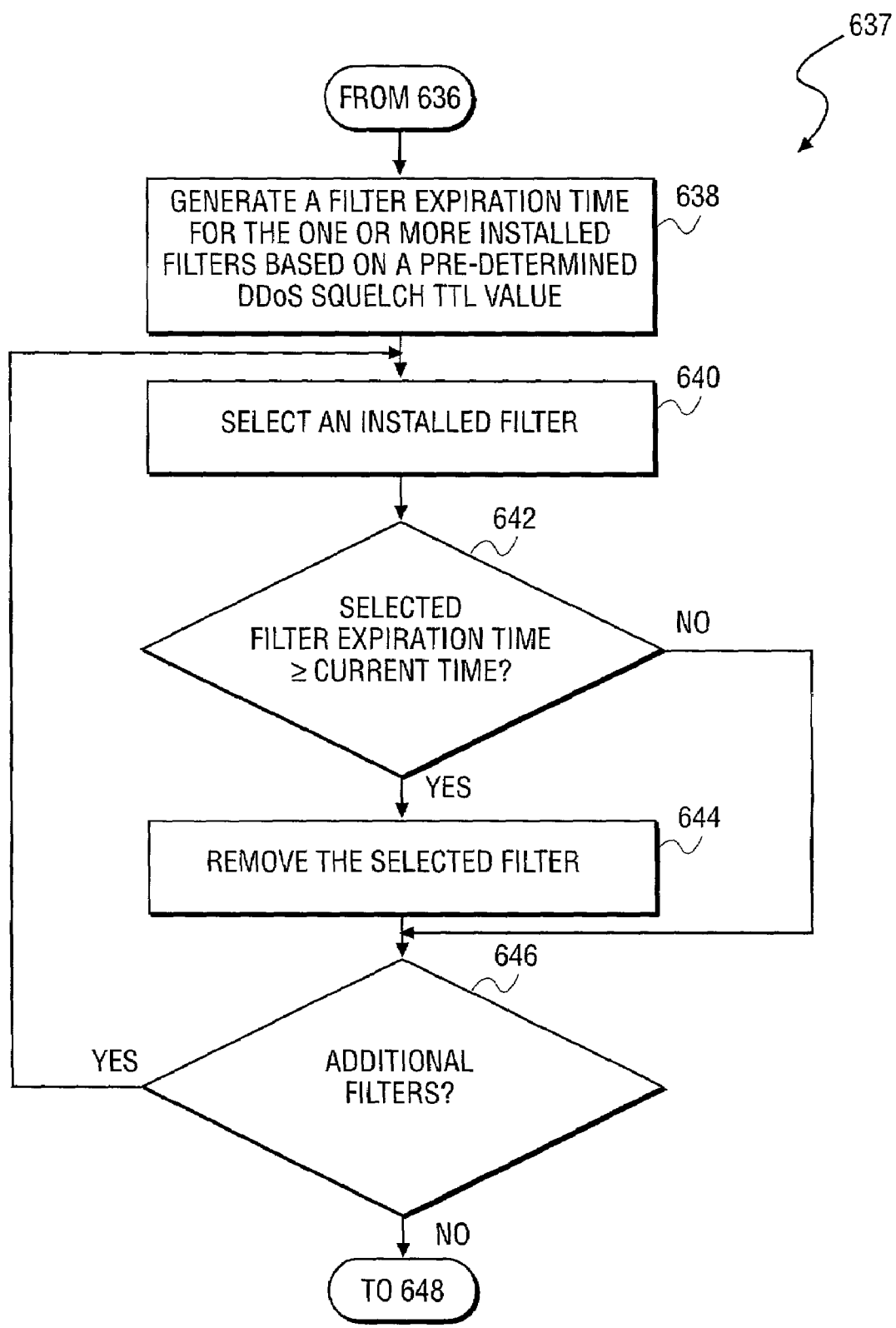
FIG. 13 depicts a block diagram illustrating an additional method for installing DDoS squelch filters in accordance with a further embodiment of the present invention.

Referring now to FIG. 13, FIG. 13 illustrates a soft-state mechanism (as it is referred to in the art) for installing DDoS squelch filters. Due to the fact that Internet host 102 may forget to uninstall DDoS squelch filters, routers require a mechanism to prevent endless accumulation of outdated DDoS squelch filters. Accordingly, FIG. 13 depicts an additional method 637 for installation of a DDoS squelch filter, for example within the egress filter 316 of FIG. 4, of process block 638, as depicted in FIG. 12. Each installed filter includes an expiration time timestamp based on a pre-determined DDoS squelch TTL value which is set by an administrator of the respective router. That timestamp represents the time at which this DDoS squelch filter should be removed.

Accordingly, at process block 638, a filter expiration time is generated for each filter based on the pre-determined DDoS squelch TTL value. Next, at process block 640, an installed filter is selected. At process block 642, expiration time of the selected DDoS squelch filter is compared to the current time. If the filter expiration time is less than the current time, at process block 644, the router removes the DDoS squelch filter from egress filter 316 of FIG. 4. If the filter expiration time is greater than the current time, nothing is done. In either case, at process block 646, the next DDoS squelch filter is checked until all currently installed DDoS squelch filters have been checked by repeating process block 640–644 for each installed DDoS squelch filter.

Figure 14:
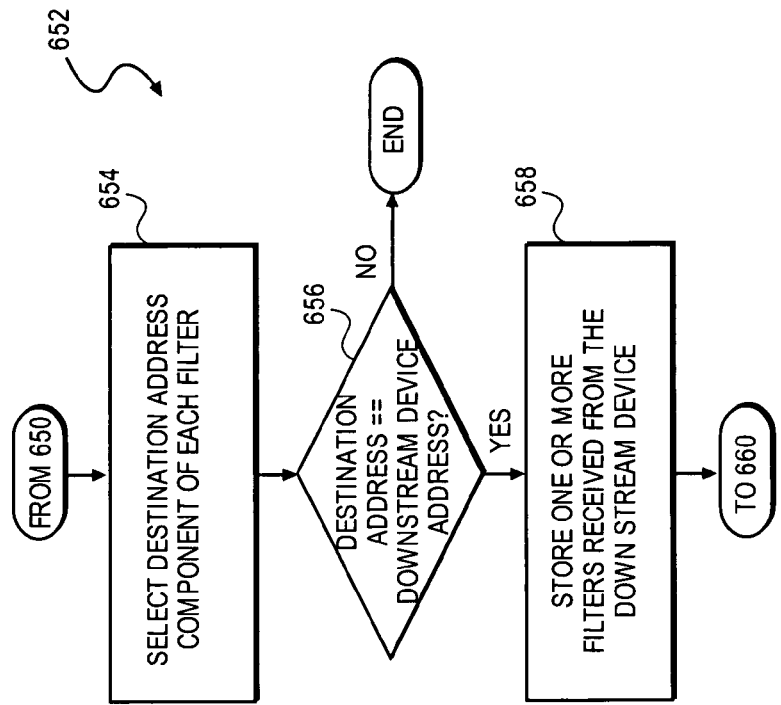
FIG. 14 depicts a block diagram illustrating an additional method for verification of the one or more received filters in accordance with a further embodiment of the present invention.

Referring now to FIG. 14, FIG. 14 depicts an additional method 652 for performing filter verification of process block 650, as depicted in FIG. 10. At process block 652, the router selects a destination address component of each received filter. Next, at process block 656, the selected destination address of each filter is compared against an IP address of the downstream device. When each selected address matches the stored address of the downstream device, process block 658 is performed. Otherwise, the one or more received filters are disregarded. Finally, at process block 658, the router 302 stores the one or more received filters from the downstream device. Once stored, control flow returns to process block 660, as depicted in FIG. 10.

Figure 15:
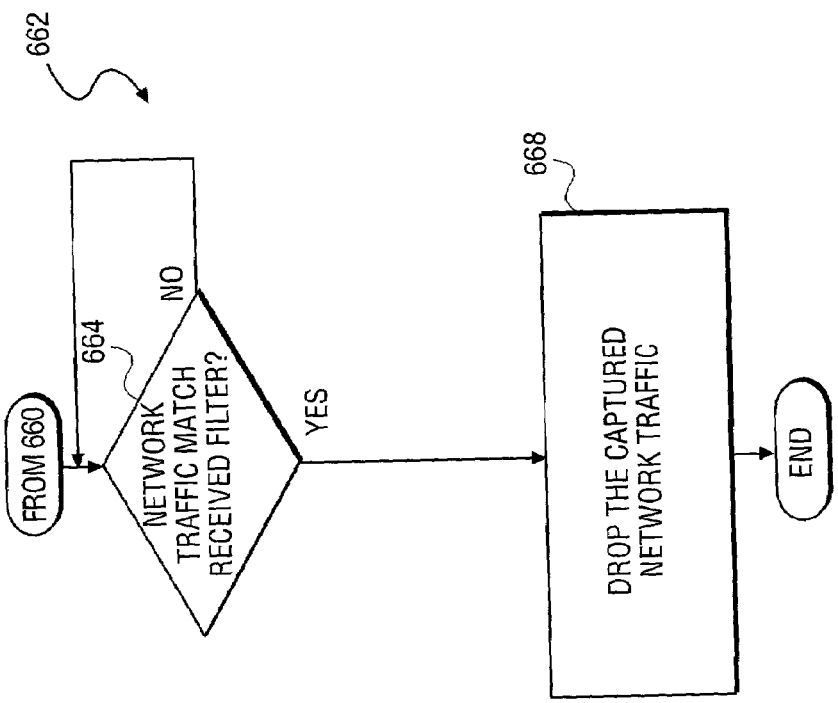
FIG. 15 depicts a block diagram illustrating an additional method for installing the one or more received squelch filters in accordance with a further embodiment of the present invention.

Referring now to FIG. 15, FIG. 15 depicts an additional method 662 for performing the installation of filters at process block 660, as depicted in FIG. 10. At process block 664, it is determined whether network traffic matches one or more of the received filters. As indicated above, network traffic matching the one or more received filters is referred to herein as "attack traffic". Finally, process block 668 is performed. At process block 668, the router drops the matching network traffic. Accordingly, as each portion of the network traffic matching the one or more received filters is dropped, the DDoS attack suffered by the Internet host 102 will eventually terminate. Once process block 668 is performed, control flow returns to process block 660, as depicted in FIG. 10.

Figure 16:
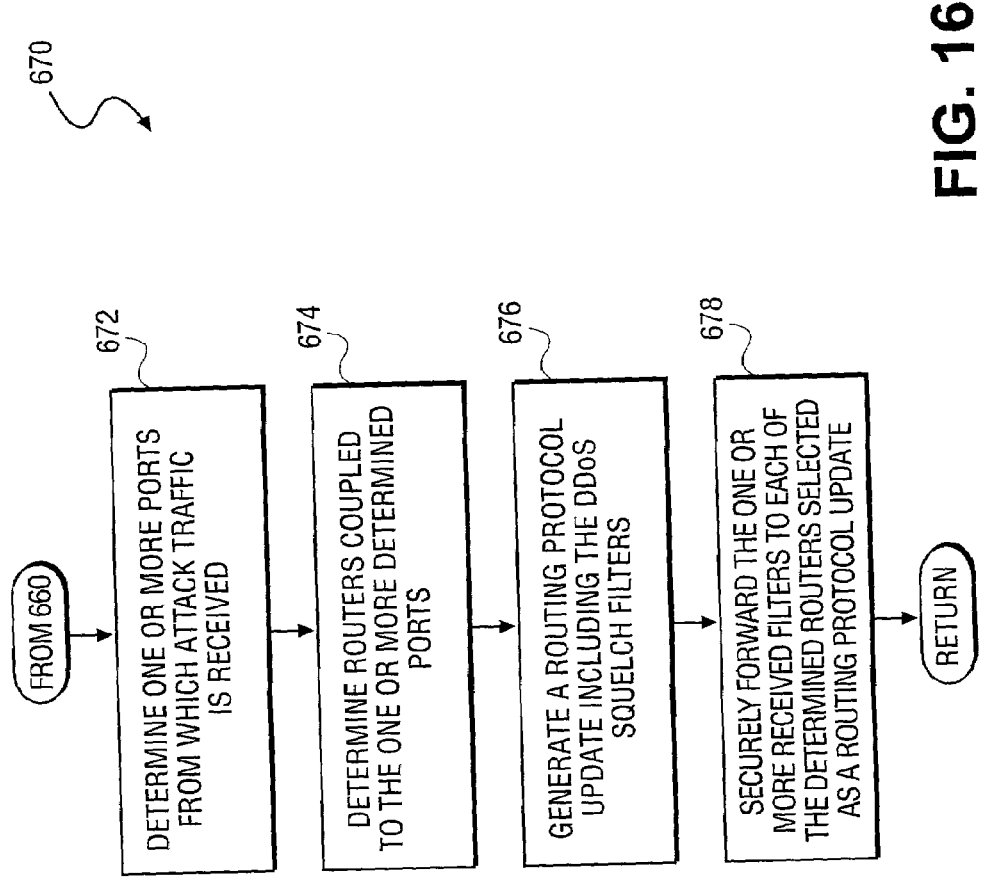
FIG. 16 depicts a block diagram illustrating a method for determining an upstream router and forwarding the one or more received squelch filters to the upstream router in accordance with an exemplary embodiment of the present invention.

Finally, referring to FIG. 16, FIG. 16 depicts a method 670 for forwarding one or more received filters from a downstream device. At process block 672, the router determines one or more ports from which attack traffic is being received based on the one or more received filters. Once determined, process block 674 is performed. At process block 674, the router determines one or more upstream routers coupled to the one or more determined ports. Next, process block 676 is performed. At process block 676, the router 302 generates a routing protocol update including the one or more DDoS squelch filters. Once generated, the router securely forwards the one or more received DDoS squelch filters to each of the determined upstream routers as a routing protocol update.

Accordingly, using the method 670, the one or more DDoS squelch filters generated by the Internet host 102 are selectively forwarded along a network path and eventually reach a source of the DDoS attack. Consequently, once determined, in one embodiment, various authorities may be contacted and alerted to the situation. As such, utilizing the various verification and security techniques described by the present invention, a system for a secure and automated response to a detection of a distributed denial of service attack is enabled. Accordingly, the human element from the action response loop of traditional response to DDoS attacks is removed, which enables attacks to be squelched from inception. As a result, the threat that DDoS attacks present to a society which is increasingly dependent on the Internet for essential services, including business as well as entertainment is diminished.

ALTERNATE EMBODIMENTS

Several aspects of one implementation of a system for providing a secure, automated response to distributed denial of service attacks have been described. However, various implementations of the automated, secure response provide numerous features including, complementing, supplementing, and/or replacing the features, such as the security authentication described above. Features can be implemented as part of a web Internet host/host or as part of a network processor such as a router in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a Internet host detection of DDoS attacks, it will be appreciated by those skilled in the art that the teaching of the present invention can be applied to other systems. In fact, systems for human response with the detection/response loop utilizing propagation of filters are within the teachings of the present invention, without departing from the scope and spirit of the present invention. The embodiments described above were chosen and described in order to best explain the principles of the invention and its practical applications. These embodiments were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiment of the invention, this disclosure is illustrative only. Changes may be made in detail, especially matters of structure and management of parts within the principles of the present invention to the full extent indicated by the broad general meaning of the terms in which the appended claims are expressed.

The present invention provides many advantages over known techniques. The present invention includes the combination of authenticated, secure filters where the destination IP address must match that of the Internet host or whose IP address is associated with the next hop router that requested the packet and whose action must be "drop" allows this service to be used in an automated fashion. This service can be used automatically because it does not broaden the trust model of either the routers or the Internet host in terms of what traffic will be passed. In addition, the Internet host is limited to the capability of restricting traffic sent to itself rather than allowing it to restrict traffic sent to others. This combination of features is what allows for this system to be used in an automatic fashion (i.e., the Internet host begins installing upstream filters for attackers as soon as it recognizes them as sources of DDoS traffic) without requiring human intervention.

Having disclosed exemplary embodiments and the best mode, modifications and variations may be made to the disclosed embodiments while remaining within the scope of the invention as defined by the following claims.

What is claimed is:

1. A method comprising:
   receiving, by an Internet host, notification of a distributed denial of service (DDoS) attack;
   establishing security authentication with an upstream router from which attack traffic, transmitted by one or more attack host computers, is received; and
   once security authentication is established, transmitting one or more filters to the upstream router such that attack traffic is dropped by the upstream router to terminate the DDoS attack, wherein the upstream router includes an upstream router administrator programmed DDoS squelch time to live value to define an expiration time for the one or more filters.

2. The method of claim 1, wherein receiving notification of the DDoS attack further comprises:
   monitoring network traffic received by an Internet host; and
   when a distributed denial of service attack is detected, notifying the Internet host of the distributed denial of service attack.

3. The method of claim 1, wherein establishing security authentication further comprises:
   transmitting a security authentication request to the upstream router including authentication information, the authentication information including a destination address of the attack traffic; and
   receiving authorization for establishment of security authentication from the upstream router.

4. The method of claim 1, wherein the transmitting the one or more filters further comprises:
   identifying attack traffic characteristics of the attack traffic received by an Internet host;
   generating one or more filters based on the identified attack traffic characteristics, such that the one or more filters direct the upstream router to drop network traffic matching the attack traffic characteristics;
   digitally signing the one or more filters using a digital signature of the Internet host, and
   transmitting the one or more digitally signed filters to the upstream router includes a digital certificate of the Internet host.

5. A method comprising:
   establishing security authentication of an Internet host under a distributed denial of service (DDoS) attack;

receiving one or more filters from the Internet host;
when security authentication is established, verifying that the one or more filters select only network traffic directed to the Internet host; and
once verified, generating a filter expiration time for each filter based on an upstream router administrator programmed DDoS squelch time to live value, such that the filters are uninstalled once the expiration time expires;
installing the one or more filters such that network traffic matching the one or more filters is prevented from reaching the Internet host.

6. The method of claim 5, wherein establishing security authentication further comprises;
receiving a request for security authentication including authentication information from the Internet host;
selecting the authentication information from the security authentication request; and
authenticating an identity of the Internet host based on the selected authentication information.

7. The method of claim 5, wherein the receiving the one or more filters further comprises;
authenticating a source of the one or more filters received as the Internet host;
once authenticated, verifying that a router administrator has programmed a DDoS squelch time to live value for received filters;
once verified, verifying that an action component of each of the filters is drop; and
otherwise, disregarding the one or more filters received from the Internet host.

8. The method of claim 5, wherein verifying the one or more filters further comprises:
selecting a destination address component for each of the one or more filters received from the Internet host;
comparing the selected destination address components against an address of the Internet host;
verifying that the selected destination addresses matches the Internet host address; and
otherwise, disregarding the one or more filters received from the Internet host.

9. The method of claim 5, wherein installing the one or more filters further comprises:
selecting network traffic matching one or mare of the filters received from the Internet host; and
dropping the selected network traffic such that attack traffic received from one or more attack host computers by the Internet host is eliminated in order to terminate the distributed denial of service attack.

10. The method of claim 5, further comprising:
determining, by an upstream router receiving the one or more filters from the Internet host, one or more ports from which the attack traffic matching the one or more filters is being received based on a routing table;
selecting a port from the one or more determined ports;
determining an upstream router connected to the selected port based on a routing table;
securely forwarding the one or more filters received from the Internet host to the detected upstream router as a routing protocol update; and
repeating the selecting, determining and utilizing for each of the one or more determined ports.

11. A method comprising:
receiving a routing protocol update from a downstream router;
selecting one or more filters from the routing protocol update received from the downstream router;
establishing security authentication of the downstream router;
once authentication is established, verifying that the one or more filters select only network traffic directed to the downstream router;
once verified, generating a filter expiration time for each filter based on an upstream router administrator programmed DDoS squelch time to live value, such that the filters are uninstalled once the expiration time expires; and
installing the one or more filters such that attack traffic matching the one or more filters is prevented from reaching the downstream router.

12. The method of claim 11, wherein establishing security authentication of the downstream router further comprises:
selecting authentication information from the routing protocol update received from the downstream router;
once selected, authenticating an identity of the downstream router based on the authentication information;
authenticating a source of the one or more filters as the downstream router;
once authenticated, verifying that a router administrator has programmed a DDoS squelch time to live value for received filters;
once verified, verifying that an action component of each of the filters is drop; and
otherwise, disregarding the one or more filters received from the downstream router.

13. The method of claim 11, wherein verifying the one or more filters further comprises:
selecting a destination address component for each of the one or more filters;
comparing the selected destination address component against a routing table;
verifying that the downstream router is a next hop router according to the routing table; and
otherwise, disregarding the one or more filters received from the downstream router.

14. The method of claim 11, further comprises:
determining, by an upstream router receiving the one or more filters from the downstream router, one or more ports from which attack traffic matching the one or more received filters is being received;
selecting a port from the one or more determined ports;
determining an upstream router coupled to the selected port based on a routing table;
securely forwarding the one or more received filters to the determined upstream router as a routing protocol update; and
repeating the selecting, determining, and forwarding for each of the one or more determined ports.

15. An article of manufacture, comprising a machine readable storage medium having associated data wherein the data, when accessed, results in a machine to perform operations, comprising:
receiving, by an Internet host, notification of a distributed denial of service (DDoS) attack;
establishing security authentication with an upstream router from which attack traffic, transmitted by one or more attack host computers, is received; and
once security authentication is established, transmitting one or more filters to the upstream router such that attack traffic is dropped by the upstream router to terminate the DDoS attack, wherein the upstream router include an upstream router administrator programmed DDoS squelch time to live value to define an expiration time for the one or more filters.

16. The article of manufacture of claim 15, wherein detecting the attack traffic causes the machine to perform further operations, comprising:
monitoring network traffic received by an Internet host; and
when a distributed denial of service attack is detected, notifying the Internet host of the distributed denial of service attack.

17. The article of manufacture of claim 15, wherein establishing security authentication causes the machine to perform further operations, comprising:
transmitting a security authentication request to the upstream router including authentication information, the authorization information including a destination address of the attack traffic; and
receiving authorization for establishment of security authentication from the upstream router.

18. The article of manufacture of claim 15, wherein transmitting the one or more filters causes the machine to perform further operations, comprising:
identifying attack traffic characteristics of the attack traffic received by an Internet host;
generating one or more filters based on the identified attack traffic characteristics, such that the one or mare filters direct the upstream router to drop network traffic matching the attack traffic characteristics;
digitally signing the one or more filters using a digital signature of the Internet host; and
transmitting the one or more digitally signed filters to the upstream router.

19. An article of manufacture, comprising a machine readable storage medium having associated data, wherein the data, when accessed, results in a machine to perform operations, comprising:
establishing a security authentication of a downstream device;
once security authentication is established, verifying that one or more filters from the downstream device select only network traffic directed to the downstream device; and
once verified, generating a filter expiration time for each filter based on an upstream router administrator programed DDoS squelch time to live value, such that the filters are uninstalled once the expiration time expires; and
installing the one or more filters such that network traffic matching the one or more filters is prevented from reaching the downstream device.

20. The article of manufacture of claim 19, wherein establishing security authentication causes the machine to perform further operations, comprising:
receiving a routing protocol update from the downstream device;
selecting authentication information from the received routing protocol update;
authenticating an identity of the downstream device based on the selected authentication information;
once authenticated, selecting the one or more filters from the received routing protocol update; and
authenticating integrity of the one or more filters based on a digital signature of the filters.

21. The article of manufacture of claim 19, wherein verifying the one or more filters causes the machine to perform further operations, comprising:
authenticating a source of the one or more filters received as the downstream device;
once authenticated, verifying that a router administrator has set a DDoS squelch time to live value for received filters;
once verified, verifying that an action component of each of the filters is drop; and
otherwise, disregarding the one or more filters received from the downstream device.

22. The article of manufacture of claim 19, wherein verifying the one or more filters causes the machine to perform further operations, comprising:
selecting a destination address component for each of the one or more filters received from the downstream device;
comparing the destination address components against an address of the downstream device;
verifying that the selected destination addresses matches the downstream device address; and
otherwise, disregarding the one or more filters received from the downstream device.

23. The article of manufacture of claim 19, wherein establishing security authentication causes the machine to perform further operations, comprising:
receiving a request for security authentication including authentication information from the downstream device;
selecting the authentication information from the security authentication request; and
authenticating an identity of the downstream device based on the selected authentication information.

24. The article of manufacture of claim 19, wherein installing the one or more filters causes the machine to perform further operations comprising:
selecting network traffic matching one or more of the filters received from the downstream device; and
dropping the selected network traffic such that attack traffic received from one or more attack host computers by the downstream device is eliminated in order to terminate a distributed denial of service attack.

25. The article of manufacture of claim 19, wherein further the machine readable storage medium further includes data, that when accessed, causes the machine to perform further operations, comprising:
determining, by an upstream router receiving the one or more filters from the downstream router, one or more ports from which attack traffic matching the one or more received filters is being received;
selecting a port from the one or more determined ports;
determining an upstream router coupled to the selected port based on a routing table;
securely forwarding the one or more received filters to the determined upstream router as a routing protocol update; and
repeating the selecting, determining and forwarding for each of the one or more determined parts.

26. An apparatus, comprising:
a processor having circuitry to execute instructions;
a control plane interface coupled to the processor, the control plane interface to packet processing filters, and to authenticate a source of the packet processing filters; and
a storage device coupled to the processor, having sequences of instructions stored therein, which when executed by the processor cause the processor to:
establish a security authentication of a downstream device, once security authentication is established, verify that one or more filters from the downstream device select only network traffic directed to the downstream device, once verified, generate a filter expiration time for each filter based on an upstream router administrator programmed DDoS squelch time to live value, such that the filters are uninstalled once the expiration time expires; and install the one or more filters such that network traffic matching the one or more filters is prevented from reaching the downstream device.

27. The apparatus of claim 26, wherein the instruction to establish security authentication further causes the processor to:

receive a routing protocol update from the downstream device;

select authentication information the received from routing protocol update;

authenticate an identity of the downstream device based on the selected authentication information;

once authenticated, select the one or more filters from the received routing protocol update; and authenticate integrity of the one or more filters based on a digital signature of the filters.

28. The apparatus of claim 26, wherein the instruction to receive the one or more filters further causes the processor to:

authenticate a source of the one or more filters received as the downstream device;

once authenticated, verify that a router administrator has programmed a DDoS squelch time to live value for received filters;

once verified, verify that an action component of each of the filters is drop; and otherwise, disregard the one or more filters received from the downstream device.

29. The apparatus of claim 26, wherein the instruction to verify the one or more filters further causes the processor to:

select a destination address component for each of the one or more filters received from the downstream device, compare the destination address components against routing table, verify that the downstream device is a next hop router according to the routing table, and otherwise, disregard the one or more filters received from the downstream device.

30. The apparatus of claim 26, wherein instruction to install the one or more filters further causes the processor to:

select network traffic matching one or more of the filters received from the downstream device, and drop the selected network traffic such that attack traffic received from one or more host attack computers by the downstream device is eliminated in order to terminate a distributed denial of service attack.

31. The apparatus of claim 26, wherein the processor is further caused to:

determine, by a router receiving the one or more filters from the downstream device, one or more ports from which the attack traffic matching the one or more filters is being received based on a routing table, determine one or more upstream routers connected to the determined ports, establish a secure connection with each of the one or more upstream routers, and forward the one or more filters received from the downstream device to the one or more upstream routers.

32. The apparatus of claim 26, wherein the instruction to establish security authentication further causes the processor to:

receiving a request for security authentication including authentication information from the downstream device;

decrypting the received authentication information;

selecting the authentication information from the security authentication request; and authenticating an identity of the downstream device based on the selected authentication information.

33. A system comprising:

an Internet host;

a wide area network; and a router coupled between the Internet host and the wide area network, the router having:

a processor having circuitry to execute instructions;

a control plane interface coupled to the processor, the control plane interface to receive packet processing filers, and to authenticate a source of the packet processing filters; and a storage device coupled to the processor, having sequences of instructions stored therein, which when executed by the processor cause the processor to:

establish security authentication of an Internet host under a distributed denial of service (DDoS) attack;

receive one or more filters from the Internet host;

when security authentication is established, verify that the one or more filters select only network traffic directed to the Internet host; and once verified, generate a filter expiration time for each filter based on a router administrator programmed DDoS squelch time to live value, such that the filters are uninstalled once the expiration time expires; and install the one or more filters such that network traffic matching the one or more filters is prevented from reaching the Internet host.

34. The system of claim 33, wherein the Internet host receives notification of a distributed denial of service attack, establishes security authentication from an upstream router from which the attack traffic, transmitted by one or more attack host computers, is received, and transmits one or more filters to the upstream router such that attack traffic is dropped by the upstream router, thereby terminating the distributed denial of service attack.

35. The system of claim 33, wherein the processor is further caused to:

determine, by a router receiving the one or more filters from a downstream device, one or more ports from which the attack traffic matching the one or more filters is being received based on a routing table, determine one or more upstream routers connected to the determined ports, and securely forward the one or more filters received from the downstream device to the one or more upstream routers as a routing protocol update.

* * * * *

UNITED STATES PATENT AND TRADEMARK OFFICE
CERTIFICATE OF CORRECTION

PATENT NO. : 7,028,179 B2 Page 1 of 1
APPLICATION NO. : 09/898849
DATED : April 11, 2006
INVENTOR(S) : Anderson et al.

It is certified that error appears in the above-identified patent and that said Letters Patent is hereby corrected as shown below:

In column 19, at line 44, delete "mare" and insert --more--.

In column 21, at line 24, delete "mare" and insert --more--.

Signed and Sealed this

First Day of August, 2006

JON W. DUDAS
*Director of the United States Patent and Trademark Office*